United States Patent
Ooe et al.

(10) Patent No.: US 8,980,496 B2
(45) Date of Patent: Mar. 17, 2015

(54) SOLID OXIDE FUEL CELL

(75) Inventors: Toshiharu Ooe, Kitakyushu (JP);
Katsuhisa Tsuchiya, Kitakyushu (JP);
Kiyotaka Nakano, Kitayushu (JP);
Tsukasa Shigezumi, Kitakyushu (JP);
Yoshiyuki Kawamura, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 742 days.

(21) Appl. No.: 13/262,141

(22) PCT Filed: Mar. 31, 2010

(86) PCT No.: PCT/JP2010/055916
§ 371 (c)(1),
(2), (4) Date: Sep. 29, 2011

(87) PCT Pub. No.: WO2010/114049
PCT Pub. Date: Oct. 7, 2010

(65) Prior Publication Data
US 2012/0028158 A1 Feb. 2, 2012

(30) Foreign Application Priority Data
Mar. 31, 2009 (JP) .................................. 2009-087351

(51) Int. Cl.
*H01M 8/04* (2006.01)
*H01M 8/12* (2006.01)

(52) U.S. Cl.
CPC ...... *H01M 8/04798* (2013.01); *H01M 8/04447* (2013.01); *H01M 8/04455* (2013.01); *H01M 2008/1293* (2013.01); *Y02E 60/50* (2013.01); *Y02E 60/525* (2013.01); *H01M 8/0432* (2013.01); *H01M 8/04619* (2013.01); *H01M 8/04679* (2013.01); *H01M 8/04753* (2013.01)
USPC .......................................................... 429/443

(58) Field of Classification Search
USPC .................................................. 429/400–535
See application file for complete search history.

(56) References Cited

FOREIGN PATENT DOCUMENTS

| JP | 05-003041 A | 1/1993 |
|---|---|---|
| JP | 2003-217627 A | 7/2003 |
| JP | 2004-164909 A | 6/2004 |
| JP | 2004-220949 A | 8/2004 |
| JP | 2006-164740 A | 6/2006 |

(Continued)

OTHER PUBLICATIONS

International Search Report for International Application No. PCT/JP2010/055916, dated Jul. 20, 2010, 2 pages.

(Continued)

*Primary Examiner* — Muhammad Siddiquee
(74) *Attorney, Agent, or Firm* — Brinks Gilson & Lione

(57) ABSTRACT

A solid oxide fuel cell is provided with which the further advance of degradation can be restrained relative to fuel cell units in which degradation has advanced. The present invention is a solid oxide fuel cell system which varies output power in response to a required generation amount. The system comprises a fuel cell module furnished with multiple fuel cell units, a fuel supply device for supplying fuel to the fuel cell module, an oxidant gas supply device for supplying oxidant gas to the fuel cell module, and a controller for changing the amount of fuel supplied from the fuel supply means in response to the required generation amount. The controller reduces the rate of change in the fuel supply amount per unit time when the required generation amount changes subsequent to an estimate or determination that the fuel cell module has degraded.

4 Claims, 12 Drawing Sheets

(56) References Cited

FOREIGN PATENT DOCUMENTS

| | | |
|---|---|---|
| JP | 2006-164741 A | 6/2006 |
| JP | 2006-244821 A | 9/2006 |
| JP | 2006-302578 A | 11/2006 |
| JP | 2006-339072 A | 12/2006 |
| JP | 2007-087756 A | 4/2007 |
| JP | 2007-157604 A | 6/2007 |
| JP | 2008-159362 A | 7/2008 |
| JP | 2009-059556 A | 3/2009 |

OTHER PUBLICATIONS

Written Opinion of the International Searching Authority for International Application No. PCT/JP2010/055916, dated Jul. 20, 2010, 5 pages.

International Preliminary Report on Patentability for International Application No. PCT/JP2010/055916, dated Nov. 15, 2011, 6 pages.

Extended European Search Report in corresponding European Application No. 10758820.4, dated Jan. 21, 2014, 6 pages.

SOLID OXIDE FUEL CELL

TECHNICAL FIELD

The present invention relates to a solid oxide fuel cell, and more particularly to a solid oxide fuel cell for varying its output power in response to an required generation amount.

BACKGROUND ART

Solid oxide fuel cells ("SOFCs" below) operate at relatively high temperatures has an oxide ion conductive solid electrolyte as an electrolyte and electrodes placed on both sides thereof. Fuel gas is supplied to one side thereof, and oxidizer (air, oxygen, or the like) is supplied to the other side thereof.

In such SOFCs, steam or $CO_2$ is produced by the reaction between fuel and oxygen ions passed through the oxide ion conductive solid electrolyte, thereby generating electrical and thermal energy. The electrical energy is extracted from the SOFCs, where it is used for various electrical purposes. At the same time, thermal energy is used to raise the temperature of the fuel, SOFCs, oxidant, and the like.

It is known that fuel cell units degrade with usage over long time periods. Unexamined Patent Application 2007-87756 (Patent Document 1) sets forth solid oxide fuel cells. It is stated that in the fuel cells, degradation of the fuel cells can be reduced by adjusting the flow rate of fuel.

A fuel supply amount control device, fuel supply amount control method, and electrical power supply system are also set forth in Unexamined Patent Application 2003-217627 (Patent Document 2). In this fuel supply amount control device, the amount of fuel supplied is compensated when the electrical power extractable from a predetermined amount of fuel supplied decreases due to degradation of fuel cells.

PRIOR ART REFERENCES

Patent References

Patent Document 1: Unexamined Patent Application 2007-87756
Patent Document 2: Unexamined Patent Application 2003-217627

SUMMARY OF THE INVENTION

Problems the Invention Seeks to Resolve

As described above, in the fuel supply control device set forth in Unexamined Patent Application 2003-217627 (Patent Document 2), the amount of fuel supplied is compensated based on the output power relative to a fixed fuel supply amount. However, the problem arises that when, in order to maintain a pre-degradation level of output power, a control is implemented to upwardly compensate the fuel supply amount to the fuel cells whose output power relative to the amount of fuel supplied have declined due to degradation, this control actually has the opposite effect of advancing degradation of the fuel cell. If further compensation is implemented against the fuel cells in which degradation has been advanced by the compensation, the device falls into a vicious circle of yet further advance of degradation, and in some cases the life of the fuel cell may be greatly shortened.

Therefore the present invention has the object of providing a solid oxide fuel cell capable restraining further degradation of the fuel cells in which degradation has advanced.

Means for Resolving the Problems

In order to solve the above-described problems, the present invention is a solid oxide fuel cell system which varies the output power in response to a required generation amount. The system comprises a fuel cell module furnished with multiple fuel cell units, a fuel supply device for supplying fuel to the fuel cell module, an oxidant gas supply device for supplying oxidant gas to the fuel cell module, and a controller for changing the amount of fuel supplied from the fuel supply device in response to the required generation amount. The controller reduces the rate of change in the fuel supply amount per unit time when the required generation amount changes subsequent to an estimate or determination that the fuel cell module has degraded.

In the present invention thus constituted, the controller controls the fuel supply device and the oxidant gas supply device to supply fuel and oxidant gas to the fuel cell module. When fuel cell module degradation is assumed or determined, the controller reduces the rate of change per unit time in the fuel supply amount relative to the change of subsequent required generation amount.

In the present invention thus constituted, when it is assumed or determined that the fuel cell module has degraded, the rate of change per unit time in the fuel supply amount is reduced. Therefore, the temperature change in the fuel cell module progresses more gradually, and the advance of fuel cell module degradation can be restrained.

In the present invention, the controller preferably estimates the degree of fuel cell module degradation based on fuel cell module operational hours.

In the present invention thus constituted, the degree of degradation of the fuel cell module is estimated based on operating time. Therefore, control can be simply implemented to restrain the advance of degradation.

In the present invention, the controller preferably reduces the rate of change in the fuel supply amount per unit time by a greater amount when the required generation amount is changed as the degradation of the fuel cell module advances, or as the length of operation of the fuel cell module increases.

In the present invention thus constituted, the rate of change in the fuel supply amount is changed to match the degree of fuel cell module degradation. Therefore, further advancing of fuel cell module degradation can be restrained while assuring that the output power follows the required generation amount.

In the present invention, when an estimate or determination is made that degradation has progressed to a predetermined level, the controller preferably stops the control of following the required generation amount, and controls the fuel supply amount supplied to the fuel supply device so that a predetermined power is output.

In the present invention thus constituted, after degradation has advanced to a predetermined state, a fixed power is output. Therefore, the change in fuel cell module temperature can be reduced, and further advance in the degradation of the fuel cell module can be restrained.

The present invention is a solid oxide fuel cell system which varies the output power in response to a required generation amount. The system comprises a fuel cell module furnished with multiple fuel cell units, a fuel supply means for supplying fuel to the fuel cell module, an oxidant gas supply means for supplying oxidant gas to the fuel cell module, and a control means for changing the amount of fuel supplied from the fuel supply means in response to the required generation amount. The control means reduces the rate of change in the fuel supply amount per unit time when the required generation amount changes subsequent to an estimate or determination that the fuel cell module has degraded.

Effect of the Invention

Using the solid oxide fuel cell system of the present invention, the further advance of degradation can be restrained in the fuel cell units in which degradation has advanced.

EMBODIMENTS OF THE INVENTION

Next, referring to the attached drawings, a solid oxide fuel cell (SOFC) system according to an embodiment of the present invention will be discussed.

Figure 1:
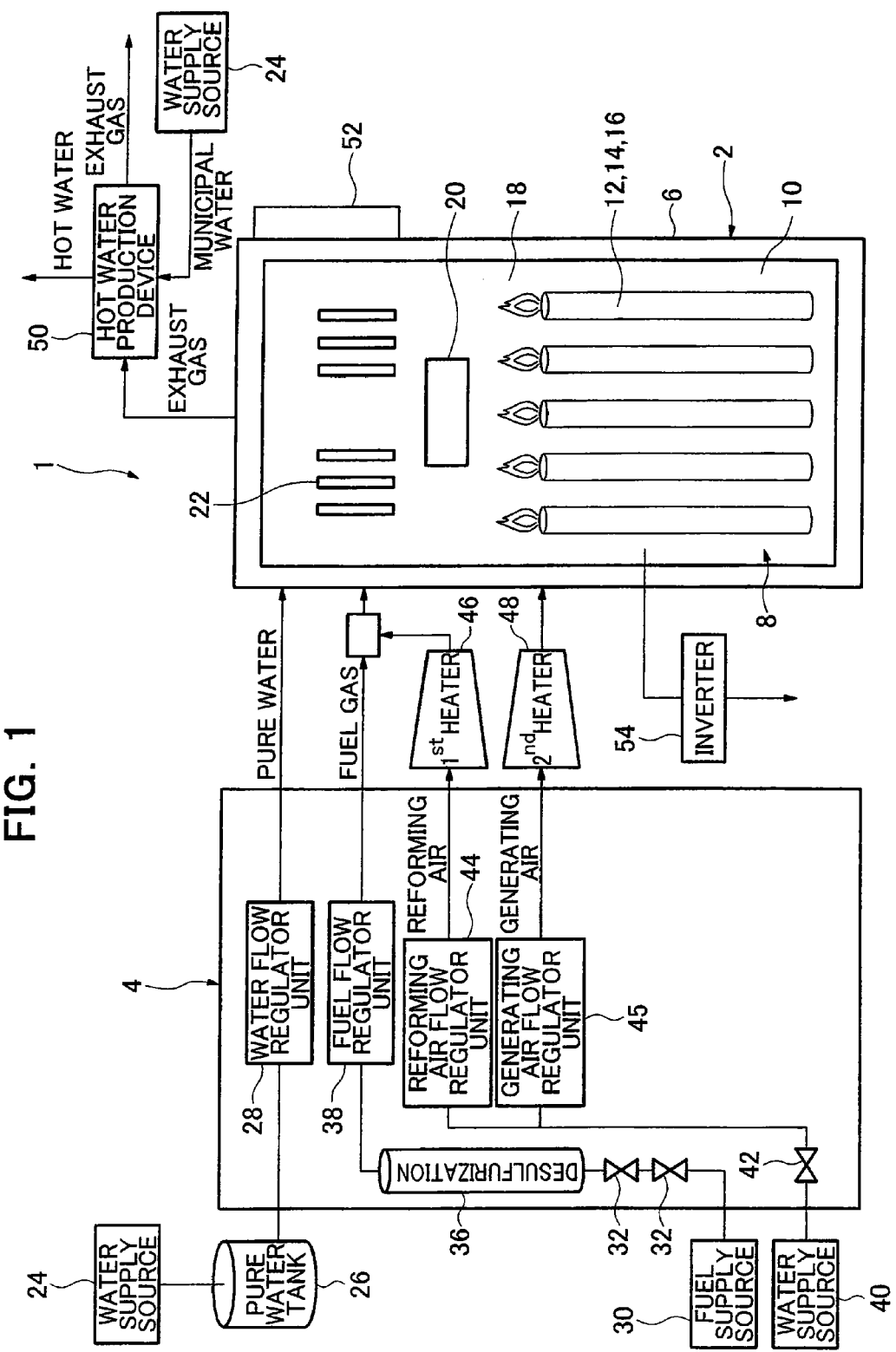
FIG. 1: An overall schematic showing a solid oxide fuel cell (SOFC) according to an embodiment of the present invention.

FIG. 1 is an overview diagram showing a solid oxide fuel cell (SOFC) system according to an embodiment of the present invention.

As shown in FIG. 1, the solid oxide fuel cell (SOFC) system of this embodiment of the present invention is furnished with a fuel cell module 2 and an auxiliary unit 4.

The fuel cell module 2 is furnished with a housing 6; a sealed space 8 is formed within the housing 6, mediated by an insulating material (not shown; the insulating material is not an indispensable structure and may be omitted). Note that it is acceptable not to provide the insulating material. A fuel cell assembly 12 for carrying out the electrical generating reaction between fuel gas and oxidant (air) is disposed in the generating chamber 10 at the lower portion of this sealed space 8. This fuel cell assembly 12 is furnished with ten fuel cell stacks 14 (see FIG. 5), and a fuel cell stack 14 comprises 16 fuel cell units 16 (see FIG. 4). Thus, the fuel cell assembly 12 has 160 fuel cell units 16, all of which are serially connected.

A combustion chamber 18 is formed above the aforementioned generating chamber 10 in the fuel cell module 2 sealed space 8; residual fuel gas and residual oxidizer (air) not used in the electrical generation reaction are burned in this combustion chamber 18 and produce exhaust gas.

A reformer 20 for reforming fuel gas is disposed at the top of the combustion chamber 18; the reformer 20 is heated by the heat of residual gas combustion to a temperature at which the reforming reaction can take place. An air heat exchanger 22 for receiving combustion heat and heating the air is further disposed above this reformer 20.

Next, the auxiliary unit 4 is furnished with a pure water tank 26 for holding water from a municipal or other water supply source 24 and filtering it into pure water, and a water flow rate regulator unit 28 (a "water pump" or the like driven by a motor) for regulating the flow rate of water supplied from the reservoir tank. The auxiliary tank 4 is further furnished with a gas shutoff valve 32 for shutting off the fuel gas supply from a fuel supply source 30 such as municipal gas or the like, and a fuel flow rate regulator unit 38 (a "fuel pump" or the like driven by a motor) for regulating the flow rate of fuel gas. Furthermore, an auxiliary unit 4 is furnished with an electromagnetic valve 42 for shutting off air serving as an oxidizer supplied from an air supply source 40, a reforming air flow rate regulator unit 44 and generating air flow rate regulator unit 45 ("air blower" or the like driven by a motor) for regulating air flow rate, a first heater 46 for heating reforming air supplied to the reformer 20, and a second heater 48 for heating generating air supplied to the generating chamber. This first heater 46 and second heater 48 are provided in order to efficiently raise the temperature at startup, and may be omitted.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater, not shown.

A control box 52 for controlling the amount of fuel gas supplied, etc. is connected to the fuel cell module 2.

Furthermore, an inverter 54 serving as an electrical power extraction unit (electrical power conversion unit) for supplying electrical power generated by the fuel cell module to the outside is connected to the fuel cell module 2.

Figure 2:
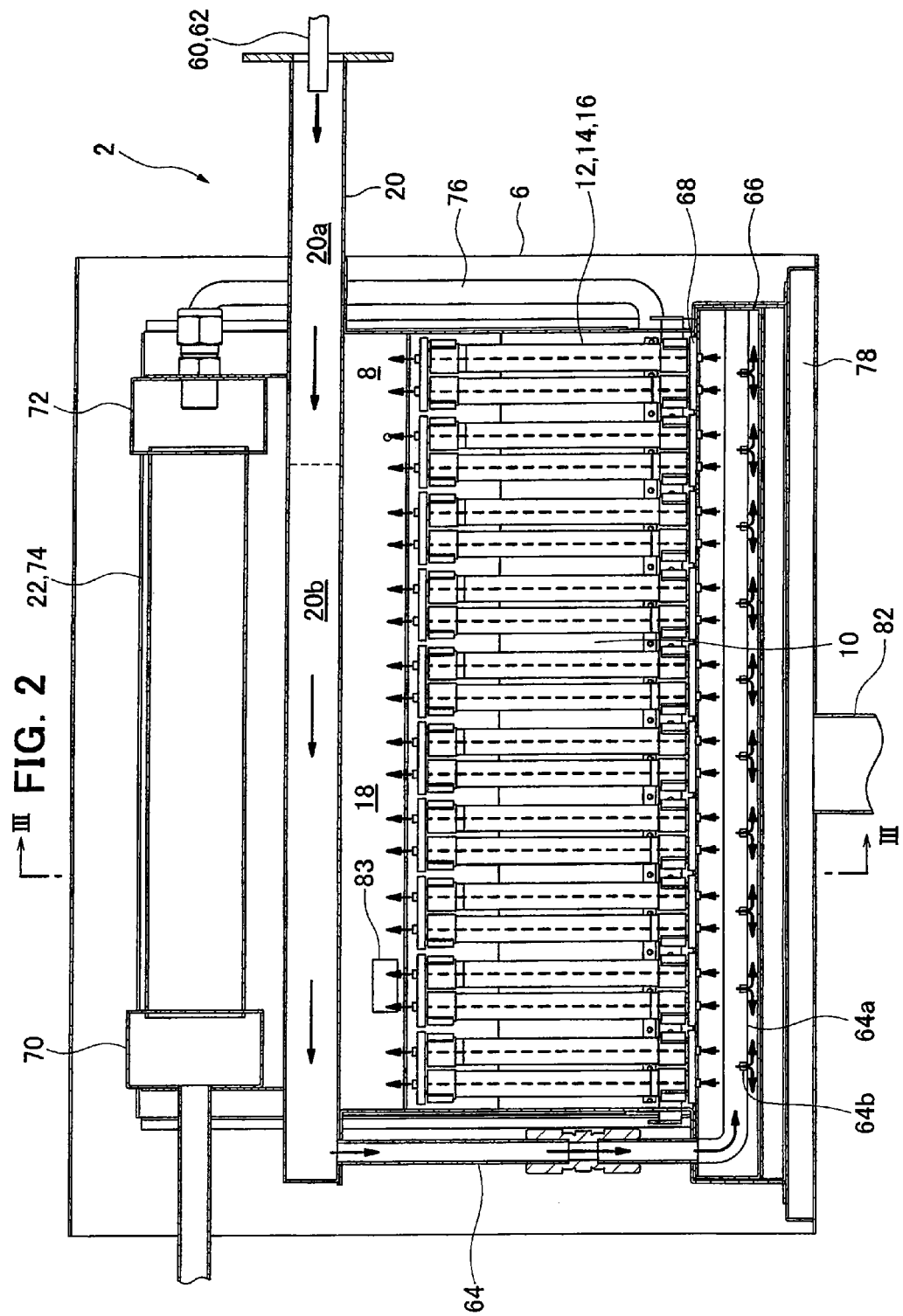
FIG. 2: A front elevation sectional diagram showing a solid oxide fuel cell (SOFC) fuel cell module according to an embodiment of the present invention.
Figure 3:
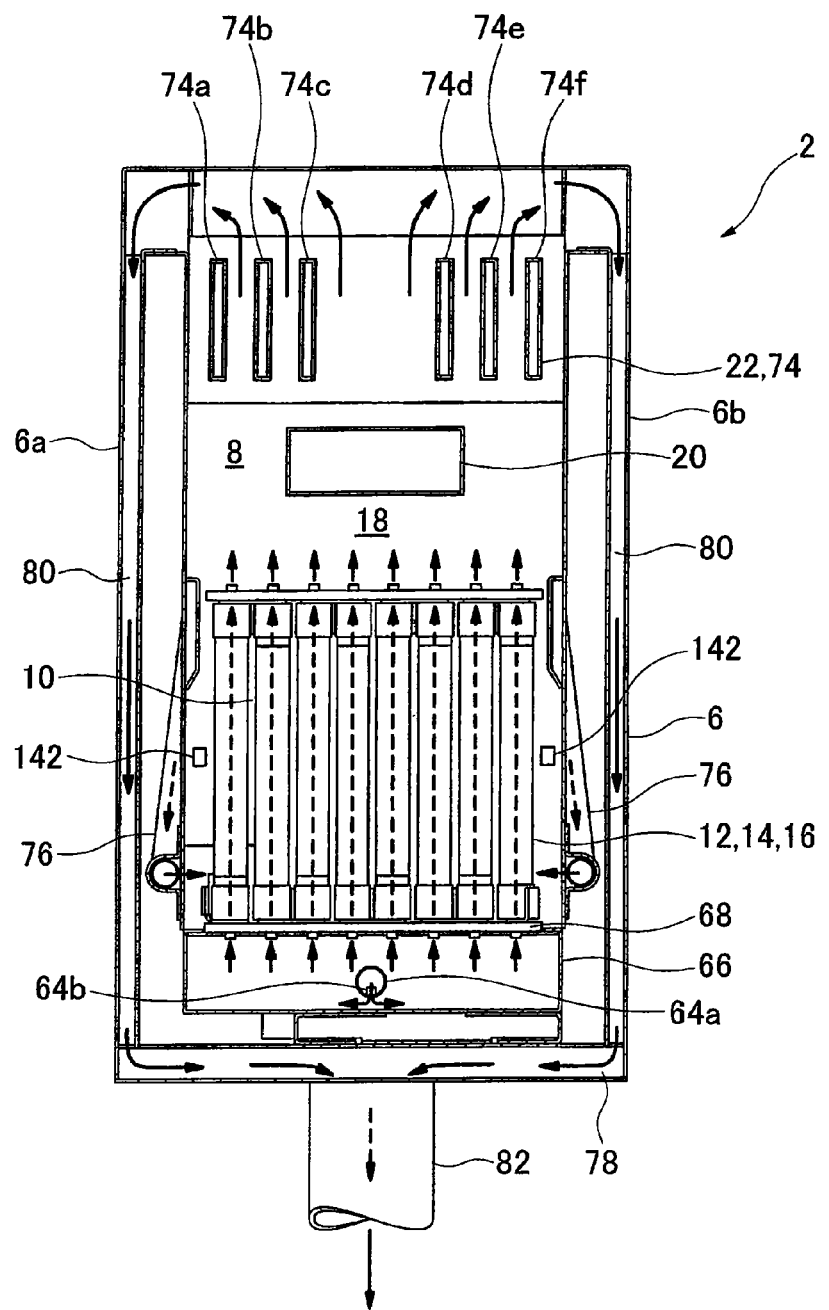
FIG. 3: A sectional diagram along line III-III in FIG. 2.

The internal structure of the fuel cell module of the solid oxide fuel cell (SOFC) system according to the embodiment of the present invention is explained using FIGS. 2 and 3. FIG. 2 is a side elevation sectional diagram showing a fuel cell module in a solid oxide fuel cell (SOFC) system according to an embodiment of the present invention; FIG. 3 is a sectional diagram along line of FIG. 2.

As shown in FIGS. 2 and 3, starting from the bottom in the sealed space 8 within the fuel cell module 2 housing 6, a fuel cell assembly 12, a reformer 20, and an air heat exchanger 22 are arranged in sequence, as described above.

A pure water guide pipe 60 for introducing pure water on the upstream end of the reformer 20, and a reform gas guide pipe 62 for introducing the fuel gas and reforming air to be reformed, are attached to the reformer 20; a vaporizing section 20a and a reforming section 20b are formed in sequence starting from the upstream side within the reformer 20, and the reforming section 20b is filled with a reforming catalyst.

Fuel gas and air blended with the steam (pure water) introduced into the reformer 20 is reformed by the reforming catalyst used to fill in the reformer 20. Appropriate reforming catalysts are used, such as those in which nickel is imparted to the surface of aluminum spheres, or ruthenium is imparted to aluminum spheres.

A fuel gas supply line 64 is connected to the downstream end of the reformer 20; this fuel gas supply line 64 extends downward, then further extends horizontally within a manifold 66 formed under the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

A lower support plate 68 provided with through holes for supporting the above-described fuel cell stack 14 is attached at the top of the manifold 66, and fuel gas in the manifold 66 is supplied into the fuel cell units 16.

Next, an air heat exchanger 22 is provided over the reformer 20. This air heat exchanger 22 is furnished with an air concentration chamber 70 on the upstream side and two air distribution chambers 72 on the downstream side; these air concentration chamber 70 and the distribution chambers 72 are connected using six air flow conduits 74. Here, as shown in FIG. 3, three air flow conduits 74 form a set (74a, 74b, 74c, 74d, 74e, 74f); air in the air concentration chamber 70 flows from each set of the air flow conduits 74 to the respective air distribution chambers 72.

Air flowing in the six air flow conduits 74 of the air heat exchanger 22 is pre-heated by rising combustion exhaust gas from the combustion chamber 18.

Air guide pipes 76 are connected to each of the respective air distribution chambers 72; these air guide pipes 76 extend downward, communicating at the bottom end side with the lower space in the generating chamber 10, and introducing preheated air into the generating chamber 10.

Next, an exhaust gas chamber 78 is formed below the manifold 66. As shown in FIG. 3, an exhaust gas conduit 80 extending in the vertical direction is formed on the insides of the front surface 6a and the rear surface 6b which form the faces in the longitudinal direction of the housing 6; the top end side of the exhaust gas conduit 80 communicates with the space in which the air heat exchanger 22 is disposed, and the bottom end side communicates with the exhaust gas chamber 78. An exhaust gas discharge pipe 82 is connected at approximately the center of the bottom surface of the exhaust gas chamber 78; the downstream end of this exhaust gas discharge pipe 82 is connected to the above-described hot water producing device 50 shown in FIG. 1.

As shown in FIG. 2, an ignition device 83 for starting the combustion of fuel gas and air is disposed on the combustion chamber 18.

Figure 4:
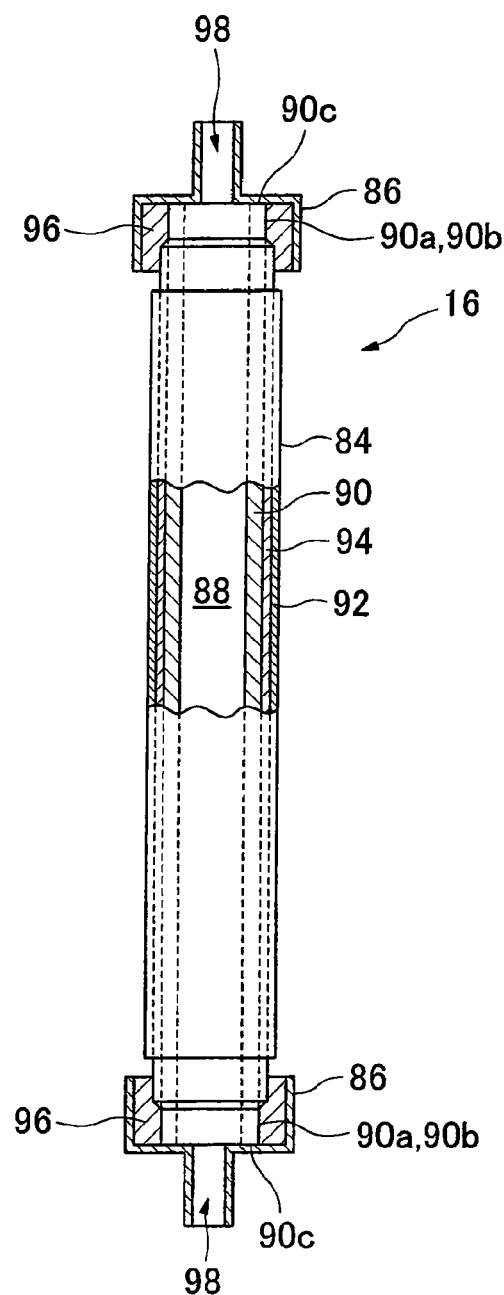
FIG. 4: A partial section showing a fuel cell units of a solid oxide fuel cell (SOFC) system according to an embodiment of the present invention.

Next we discuss the fuel cell units 16, referring to FIG. 4. FIG. 4 is a partial section showing the fuel cell units of a solid oxide fuel cell (SOFC) system according to an embodiment of the present invention.

As shown in FIG. 4, the fuel cell units 16 is furnished with a fuel cell 84 and internal electrode terminals 86, respectively connected to the respective terminals at the top and bottom of the fuel cell 84.

The fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between the internal electrode layer 90 and the external electrode layer 92. This internal electrode layer 90 is a fuel electrode through which fuel gas passes, and is a (−) pole, while the external electrode layer 92 is an air electrode which contacts the air, and is a (+) pole.

The internal electrode terminals 86 attached at the top end and bottom ends of the fuel cell device 16 have the same structure. Therefore, we will here discuss specifically the internal electrode terminal 86 attached at the top end side. The top portion 90a of the inside electrode layer 90 is furnished with an outside perimeter surface 90b and top end surface 90c, exposed to the electrolyte layer 94 and the outside electrode layer 92. The inside electrode terminal 86 is connected to the outer perimeter surface 90b of the inside electrode layer 90 through a conductive seal material 96, and is electrically connected to the inside electrode layer 90 by making direct contact with the top end surface 90c of the inside electrode layer 90. A fuel gas flow path 98 communicating with the inside electrode layer 90 fuel gas flow path 88 is formed at the center portion of the inside electrode terminal 86.

The inside electrode layer 90 is formed, for example, from at least one of a mixture of Ni and zirconia doped with at least one type of rare earth element selected from Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; silver, or the like.

Figure 5:
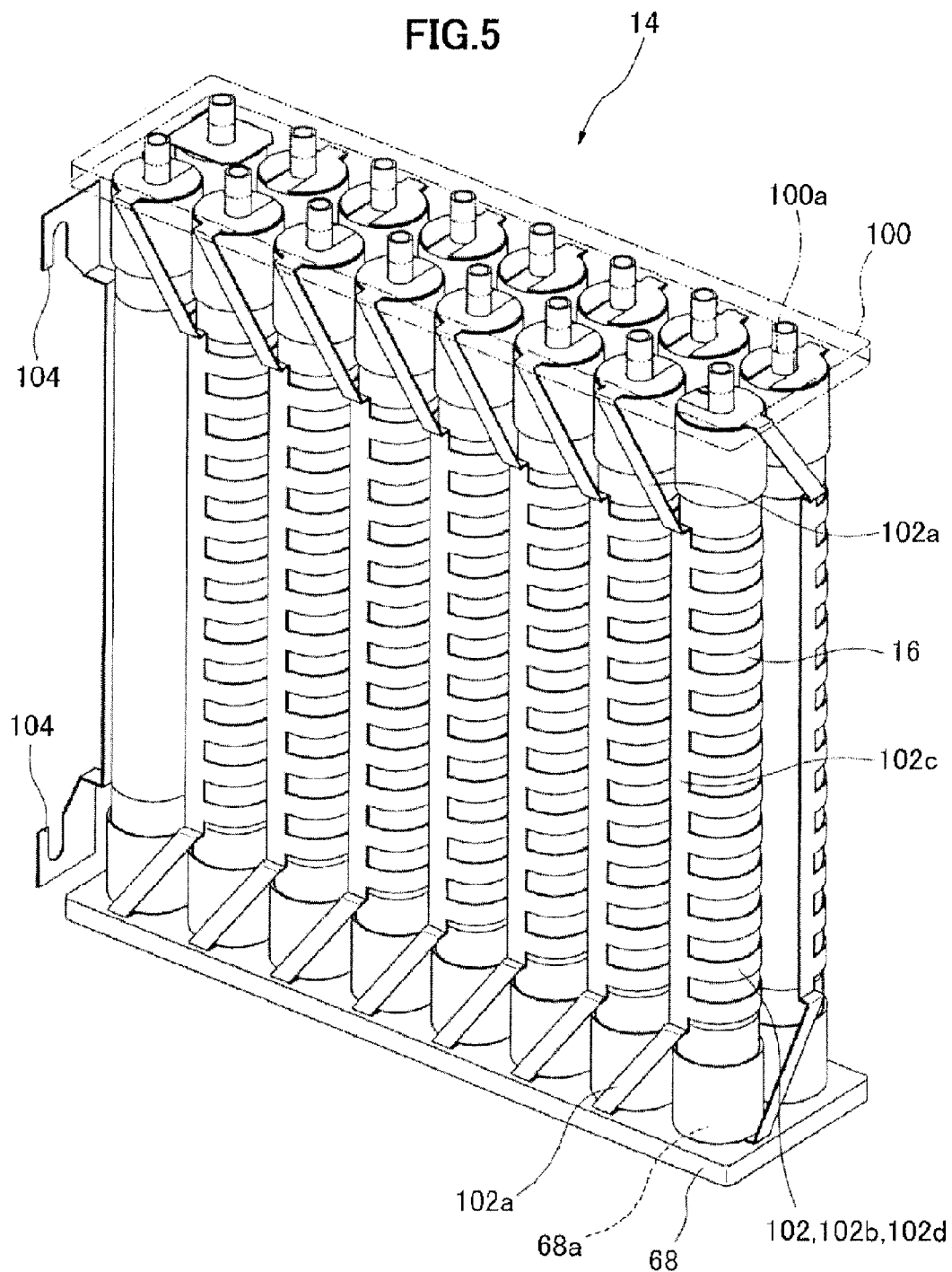
FIG. 5: A perspective diagram showing a fuel cell stack of a solid oxide fuel cell (SOFC) system according to an embodiment of the present invention.

Next we discuss the fuel cell stack 14, referring to FIG. 5. FIG. 5 is a perspective view showing the fuel cell stack in a solid oxide fuel cell (SOFC) system according to an embodiment of the present invention.

As shown in FIG. 5, the fuel cell stack 14 is furnished with sixteen fuel cell units 16; the top end side and bottom end side of these fuel cell units 16 are respectively supported by a lower support plate 68 and upper support plate 100. Through holes 68a and 100a, through which the inside electrode terminal 86 can penetrate, are provided on this lower support plate 68 and outer support plate 100.

In addition, a current collector 102 and an external terminal 104 are attached to the fuel cell units 16. This current collector 102 is integrally formed by a fuel electrode connecting portion 102a, which is electrically connected to the inside electrode terminal 86 attached to the inside electrode layer 90 serving as the fuel electrode, and by an air electrode connecting portion 102b, which is electrically connected to the entire external perimeter surface of the outside electrode layer 92 serving as the air electrode. The air electrode connecting portion 102b is formed of a vertical portion 102c extending vertically along the surface of the outside electrode layer 92, and multiple horizontal portions 102d extending in the horizontal direction from this vertical portion 102c along the surface of the outside electrode layer 92. The fuel electrode connecting portion 102a extends linearly in an upward or downward diagonal direction from the vertical portion 102c of the air electrode connecting portion 102b toward the inside electrode terminals 86 positioned in the upper and lower directions on the fuel cell units 16.

Furthermore, electrode terminals 86 at the top and bottom ends of the two fuel cell units 16 positioned at the end of the fuel cell stack 14 (at the front and back sides on the left edge in FIG. 5) are respectively connected to the outside terminals 104. These external terminals 104 are connected to the external terminals 104 (not shown) at the ends of the adjacent fuel cell stack 14, and as described above, all of the 160 fuel cell units 16 are connected in series.

Figure 6:
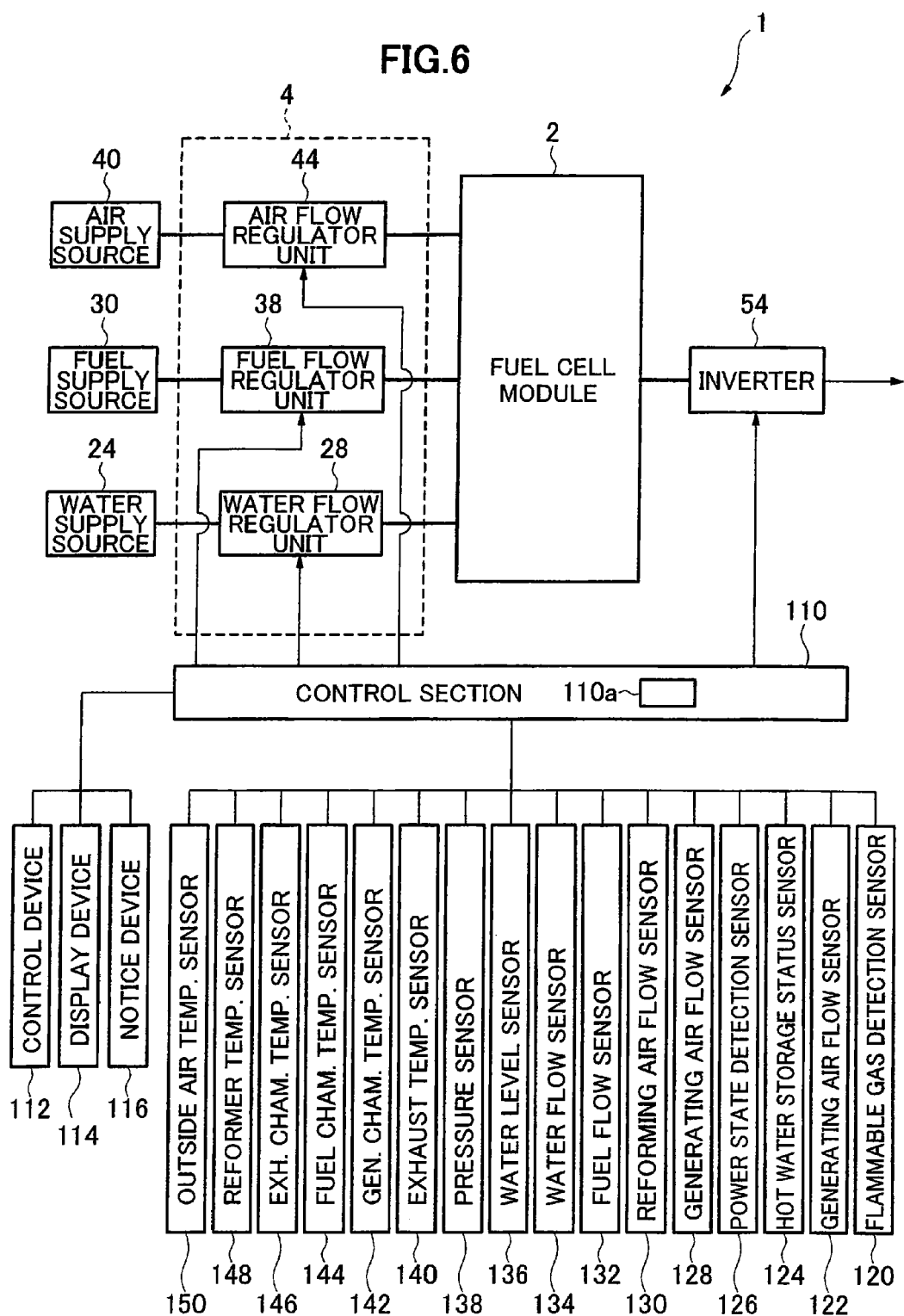
FIG. 6: A block diagram showing a solid oxide fuel cell (SOFC) system according to an embodiment of the present invention.

Next, referring to FIG. 6, the sensors attached to the solid oxide fuel cell (SOFC) system according to the present embodiment will be discussed. FIG. 6 is a block diagram showing a solid oxide fuel cell (SOFC) system according to an embodiment of the present invention.

As shown in FIG. 6, a solid oxide fuel cell device 1 is furnished with a control unit 110; an operating device 112 provided with operating buttons such as "ON" or "OFF" for user operation, a display device 114 for displaying various data such as a generator output value (Watts), and a notification device 116 for issuing warnings during abnormal states and the like are connected to this control unit 110. This notification device 116 may be connected to a remote control center to inform the control center of abnormal states.

Next, signals from the various sensors described below are input to the control unit 110.

First, a flammable gas detection sensor 120 detects gas leaks and is attached to the fuel cell module 2 and the auxiliary unit 4.

The purpose of the CO gas detection sensor 120 is to detect leakage of CO in the exhaust gas, which is meant to be exhausted to the outside via the exhaust gas conduit 80, into the external housing (not shown) which covers the fuel cell module 2 and the auxiliary unit 4.

A water reservoir state detection sensor 124 detects the temperature and amount of hot water in a water heater (not shown).

An electrical power state detection sensor 126 detects current, voltage, and the like in the inverter 54 and in a distribution panel (not shown).

A generator air flow rate detection sensor 128 detects the flow rate of generator air supplied to the generating chamber 10.

A reforming air flow rate sensor 130 detects the flow rate of reforming air flow supplied to the reformer 20.

A fuel flow rate sensor 132 detects the flow rate of fuel gas supplied to the reformer 20.

A water flow rate sensor 134 detects the flow rate of pure water (steam) supplied to the reformer 20.

A water level sensor 136 detects the water level in pure water tank 26.

A pressure sensor 138 detects pressure on the upstream side outside the reformer 20

An exhaust temperature sensor 140 detects the temperature of exhaust gas flowing into the hot water producing device 50.

As shown in FIG. 3, a generating chamber temperature sensor 142 is disposed on the front surface side and rear surface side around the fuel cell assembly 12, and detects the temperature around the fuel cell stack 14 in order to estimate the temperature of the fuel cell stack 14 (i.e., of the fuel cell 84 itself).

A combustion chamber temperature sensor 144 detects the temperature in combustion chamber 18.

An exhaust gas chamber temperature sensor 146 detects the temperature of exhaust gases in the exhaust gas chamber 78.

A reformer temperature sensor 148 detects the temperature of the reformer 20 and calculates the reformer 20 temperature from the intake and exit temperatures on the reformer 20.

If the solid oxide fuel cell (SOFC) system is placed outdoors, the outside temperature sensor 150 detects the temperature of the outside atmosphere. Sensors to detect outside atmospheric humidity and the like may also be provided.

Signals from these various sensor types are sent to the control unit 110; the control unit 110 sends control signals to the water flow rate regulator unit 28, the fuel flow rate regulator unit 38, the reforming air flow rate regulator unit 44, and the generating air flow rate regulator unit 45 based on data from the sensors, and controls the flow rates in each of these units.

The control unit 110 sends control signals to the inverter 54 to control the amount of electrical power supply.

Figure 7:
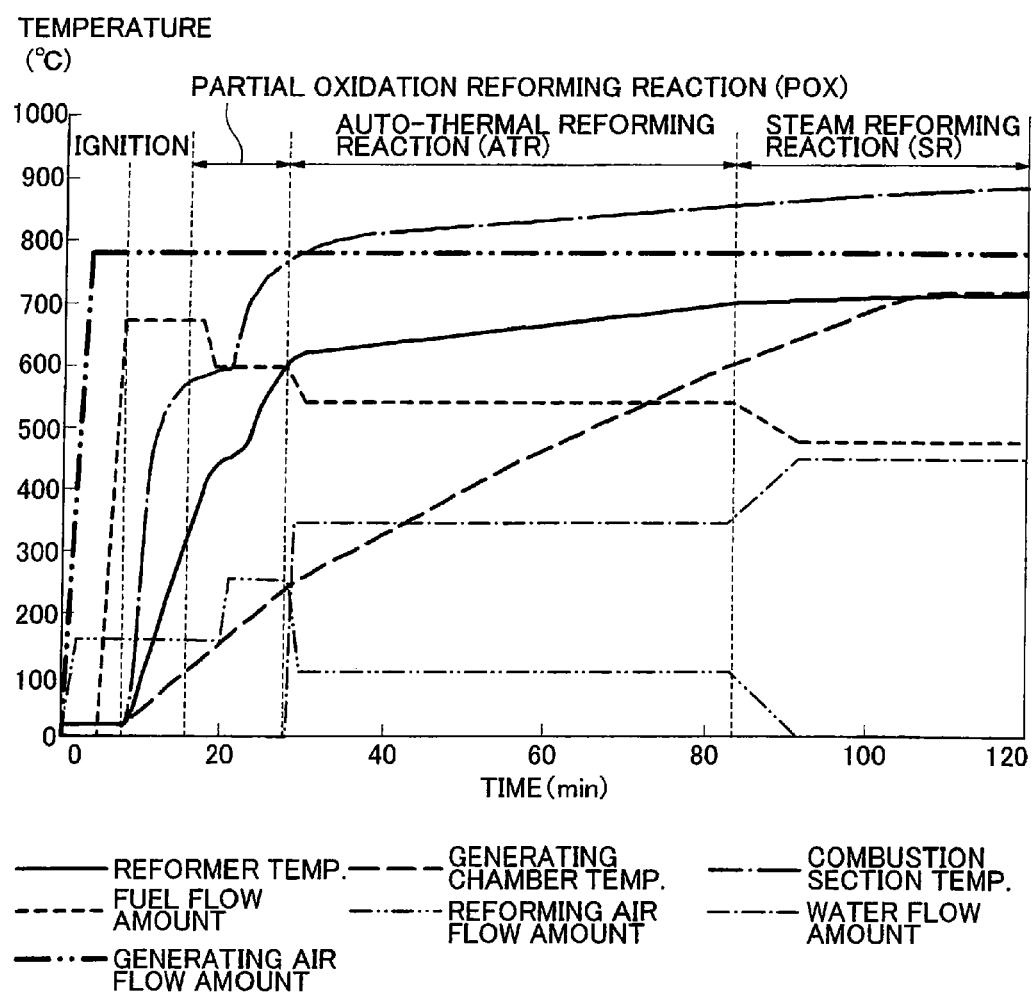
FIG. 7: A timing chart showing the operation at the time of startup of a solid oxide fuel cell (SOFC) system according to an embodiment of the present invention.

Next, referring to FIG. 7, we discuss the operation of a solid oxide fuel cell (SOFC) system according to the present embodiment at the time of startup.

FIG. 7 is a timing chart showing the operations of a solid oxide fuel cell (SOFC) according to an embodiment of the present invention at the time of startup.

At the beginning, in order to warm up the fuel cell module 2, operation starts in a no-load state, i.e., with the circuit which includes the fuel cell module 2 in an open state. At this point current does not flow in the circuit, therefore the fuel cell module 2 does not generate electricity.

First, reforming air is supplied from the reforming air flow rate regulator unit 44 through a first heater 46 to the reformer 20 on the fuel cell module 2. At the same time, generating air is supplied from the generating air flow rate regulator unit 45 through a second heater 48 to the air heat exchanger 22 of fuel cell module 2, and this generating air reaches the generating chamber 10 and the combustion chamber 18.

Immediately thereafter, fuel gas is also supplied from the fuel flow rate regulator unit 38, and fuel gas into which reform air is blended passes through the reformer 20, the fuel cell stack 14, and the fuel cell units 16 to reach the combustion chamber 18.

Next, ignition is brought about by the ignition device 83, and fuel gas and air (reforming air and generating air) supplied to the combustion chamber 18 is combusted. This combustion of fuel gas and air produces exhaust gas; the generating chamber 10 is warmed by this exhaust gas, and when the exhaust gas rises in the fuel cell module 2 sealed space 8, the fuel gas, which includes reforming air in the reformer 20 is warmed, as is the generating air inside the air heat exchanger 22.

At this point, fuel gas into which reform air is blended is supplied to the reformer 20 by the fuel flow rate regulator unit 38 and the reforming air flow rate regulator unit 44, therefore the partial oxidation reforming reaction PDX given by Expression (1) proceeds. This partial oxidation reforming reaction PDX is an exothermic reaction, and therefore has favorable starting characteristics. The fuel gas whose temperature has risen is supplied from the fuel gas supply line 64 to the bottom of the fuel cell stack 14, and by this means the fuel cell stack 14 is heated from the bottom, and the combustion chamber 18 is also heated by the combustion of the fuel gas and air, so that the fuel stack 14 is also heated from above, enabling as a result an essentially uniform rise in temperature in the vertical direction of the fuel cell stack 14. Even though the partial oxidation reforming reaction PDX is progressing, the ongoing combustion reaction between fuel gas and air is continued in the combustion chamber 18.

$$C_mH_n + xO_2 \rightarrow aCO_2 + bCO + cH_2 \tag{1}$$

When the reformer temperature sensor 148 detects that the reformer 20 has reached a predetermined temperature (e.g. 600° C.) after the start of the partial oxidation reforming reaction PDX, a pre-blended gas of fuel gas, reforming air, and steam is applied to the reformer 20 by the water flow rate regulator unit 28, the fuel flow rate regulator unit 38, and the reforming air flow rate regulator unit 44. At this point an auto-thermal reforming reaction ATR, which makes use of both the aforementioned partial oxidation reforming reaction PDX and the steam reforming reaction SR described below, proceeds in the reformer 20. This auto-thermal reforming reaction ATR can be internally thermally balanced. Therefore, the reaction proceeds in a thermally independent fashion inside the reformer 20. In other words, when there is a large amount of oxygen (air), heat emission by the partial oxidation reforming reaction PDX dominates, and when there is a large amount of steam, the endothermic steam reforming reaction SR dominates. At this stage, the initial stage of startup has passed and some degree of elevated temperature has been achieved within the generating chamber 10 Therefore, even if the endothermic reaction is dominant, no major drop in temperature will be caused. Also, the combustion reaction continues within the combustion chamber 18 even as the auto-thermal reforming reaction ATR proceeds.

When the reformer temperature sensor 146 detects that the reformer 20 has reached a predetermined temperature (e.g., 700° C.) following the start of the auto-thermal reforming reaction ATR shown as Expression (2), the supply of reforming air by the reforming air flow rate regulator unit 44 is stopped, and the supply of steam by the water flow rate regulator unit 28 is increased. By this means, a gas containing no air and only containing fuel gas and steam is supplied to the reformer 20, where the steam reforming reaction SR of Expression (3) proceeds.

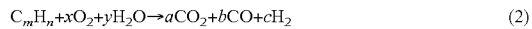

$$C_mH_n + xO_2 + yH_2O \rightarrow aCO_2 + bCO + cH_2 \quad (2)$$

$$C_mH_n + xH_2O \rightarrow aCO_2 + bCO + cH_2 \quad (3)$$

This steam reforming reaction SR is an endothermic reaction. Therefore, the reaction proceeds as a thermal balance is maintained with the combustion heat from the combustion chamber 18. At this stage, the fuel cell module is in the final stages of startup. Therefore, the temperature has risen to a sufficiently high level within the generating chamber 10 so that no major temperature dropped is induced in the generating chamber 10 even though an endothermic reaction is proceeding. Also, the combustion reaction continues to proceed in the combustion chamber 18 even as the steam reforming reaction SR is proceeding.

Thus, after the fuel cell module 2 has been ignited by the ignition device 83, the temperature inside the generating chamber 10 gradually rises as a result of the partial oxidation reforming reaction PDX, the auto-thermal reforming reaction ATR, and the steam reforming reaction SR which proceed in that sequence. Next, when the temperature inside the generating chamber 10 and the temperature of the fuel cell 84 reaches a predetermined generating temperature which is lower than the rated temperature at which the cell module 2 can be stably operated, the circuit which includes the fuel cell module 2 is closed, electrical generation by the fuel cell module 2 begins, and current then flows to the circuit. Generation of electricity by the fuel cell module 2 causes the fuel cell 84 itself to emit heat, such that the temperature of the fuel cell 84 rises. As a result, the rated temperature at which the fuel cell module 2 is operated becomes, for example, 600° C.-800° C.

Following this, an amount of fuel gas and air greater than that consumed by the fuel cell 84 is applied in order to maintain the rated temperature and continue combustion inside the combustion chamber 18. Generation of electricity by the high reform-efficiency steam reforming reaction SR proceeds while electricity is being generated.

Figure 8:
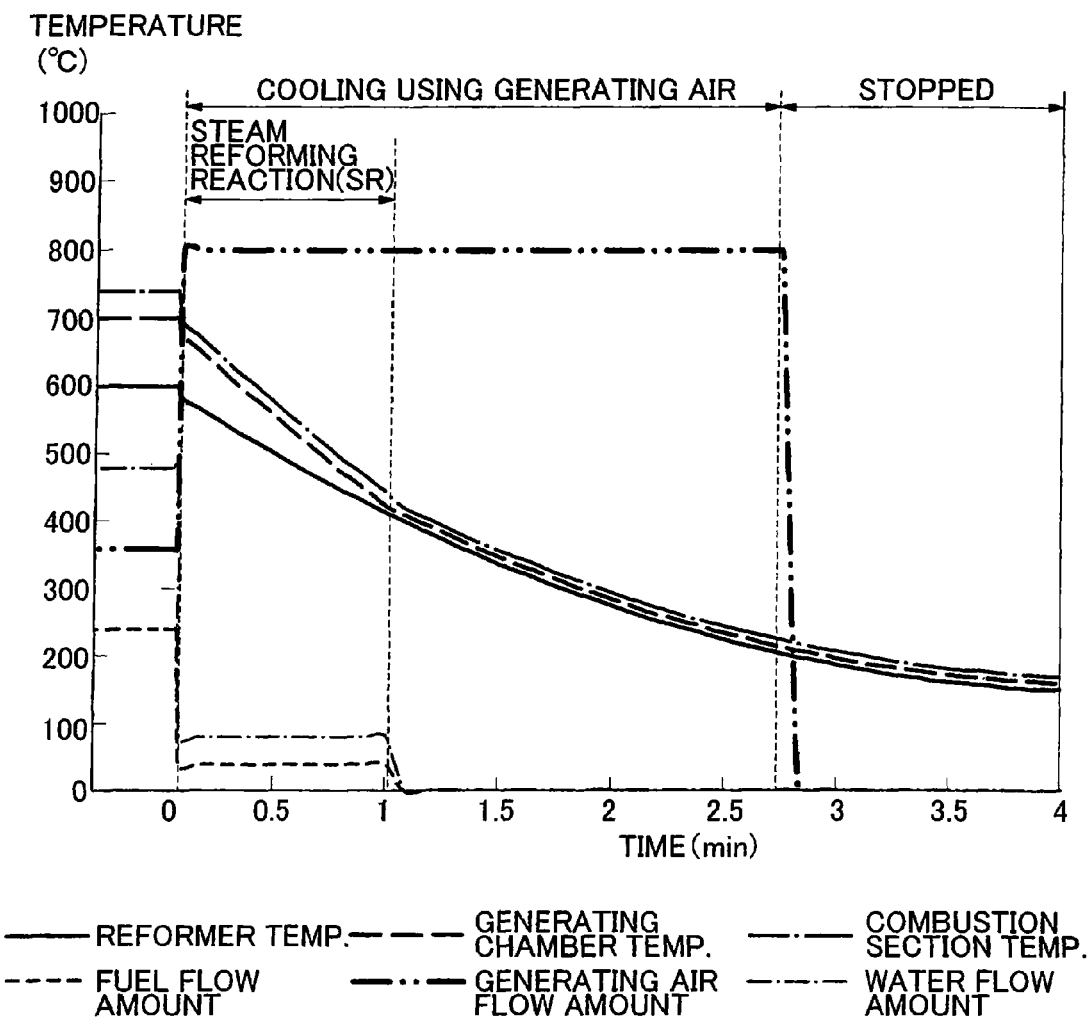
FIG. 8: A timing chart showing the operation at the time of shutdown of a solid oxide fuel cell (SOFC) system according to an embodiment of the present invention.

Next, referring to FIG. 8, we discuss the operation upon stopping the solid oxide fuel cell (SOFC) system of the present embodiment. FIG. 8 is a timing chart showing the operations which occur upon stopping the solid oxide fuel cell (SOFC) system of the present embodiment.

As shown in FIG. 8, when stopping the operation of the fuel cell module 2, the fuel flow rate regulator unit 38 and the water flow rate regulator unit 28 are first operated to reduce the amount of fuel gas and steam being supplied to the reformer 20.

When stopping the operation of the fuel cell module 2, the amount of generating air supplied by the reforming air flow rate regulator unit 44 into the fuel cell module 2 is being increased at the same time that the amount of fuel gas and steam being supplied to the reformer 20 is being reduced; the fuel cell assembly 12 and the reformer 20 are air cooled to reduce their temperature. Thereafter, when the temperature of the generating chamber drops to, for example, 400° C., supply of the fuel gas and steam to the reformer 20 is stopped, and the steam reforming reaction SR in the reformer 20 ends. Supply of the generating air continues until the temperature in the reformer 20 reaches a predetermined temperature, e.g. 200° C.; when the predetermined temperature is reached, the supply of generating air from the generating air flow rate regulator unit 45 is stopped.

Thus in the present embodiment the steam reforming reaction SR by the reformer 20 and cooling by generating air are used in combination. Therefore, when the operation of the fuel cell module 2 is stopped, that operation can be stopped relatively quickly.

Next, referring to FIGS. 9 through 12, we discuss the operation of a solid oxide fuel cell system according to an embodiment of the present invention.

Figure 9:
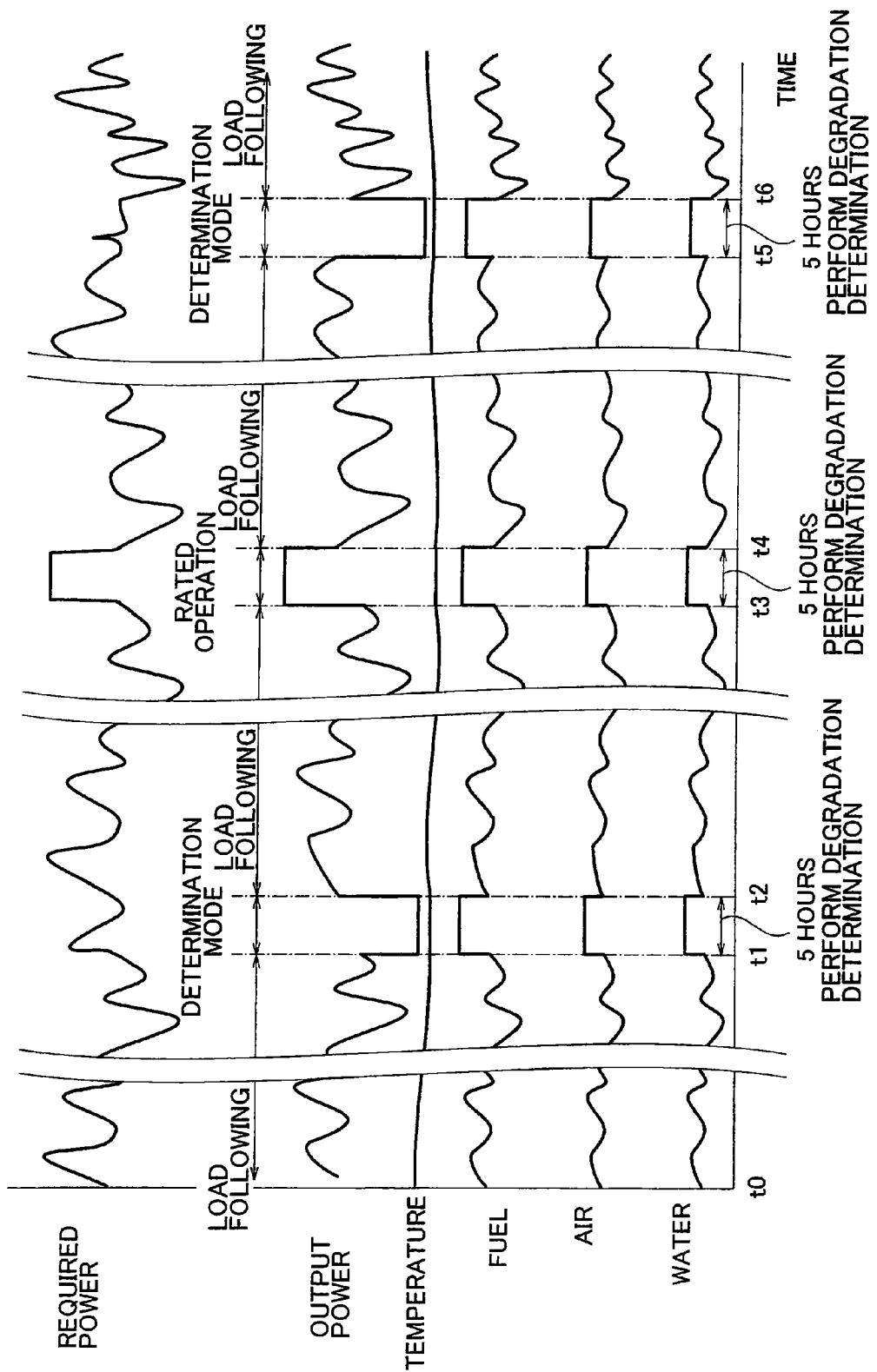
FIG. 9: A timing chart explaining the determination of degradation in a solid oxide fuel cell (SOFC) system according to an embodiment of the present invention.
Figure 10:
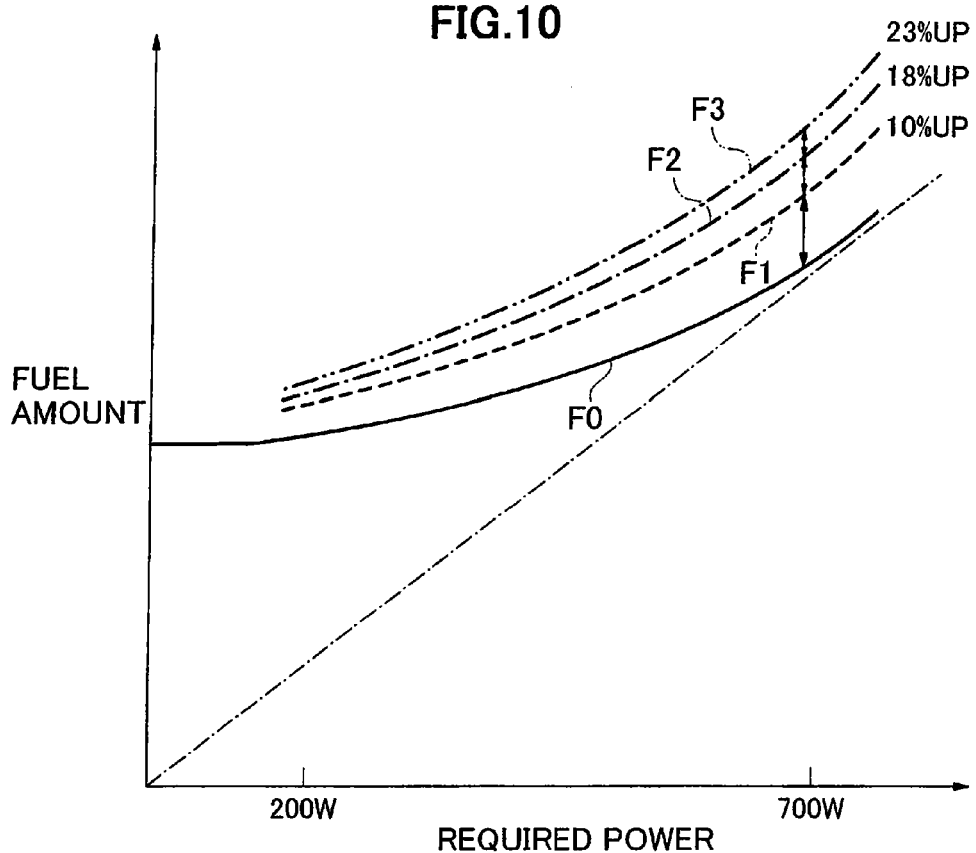
FIG. 10: A graph showing an example of the relationship between the required generation amount input to the control section and the fuel supply amount required to produce the required generation amount.
Figure 11:
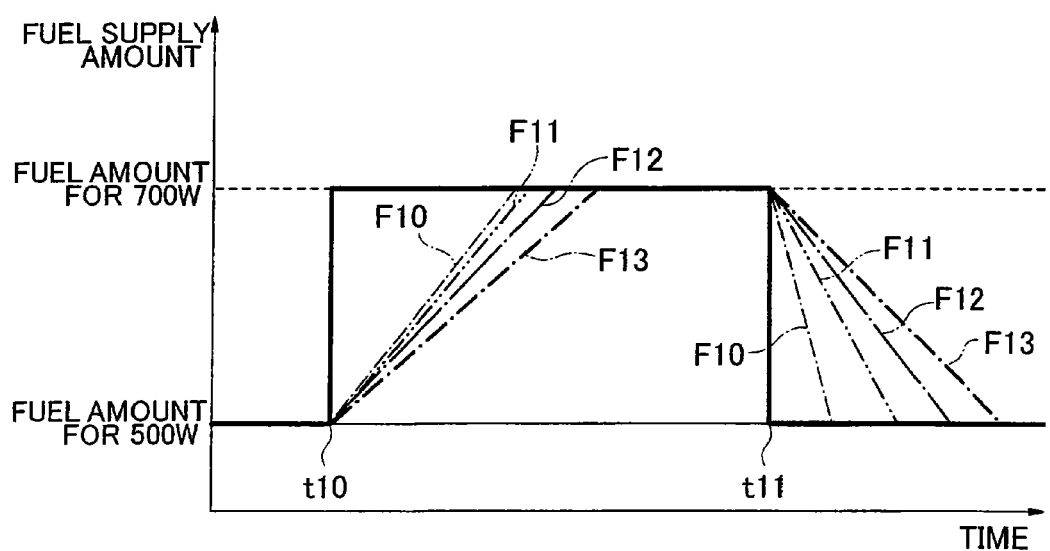
FIG. 11: A graph showing an example of the change over time in fuel supply amount relative to the change in required generation amount.
Figure 12:
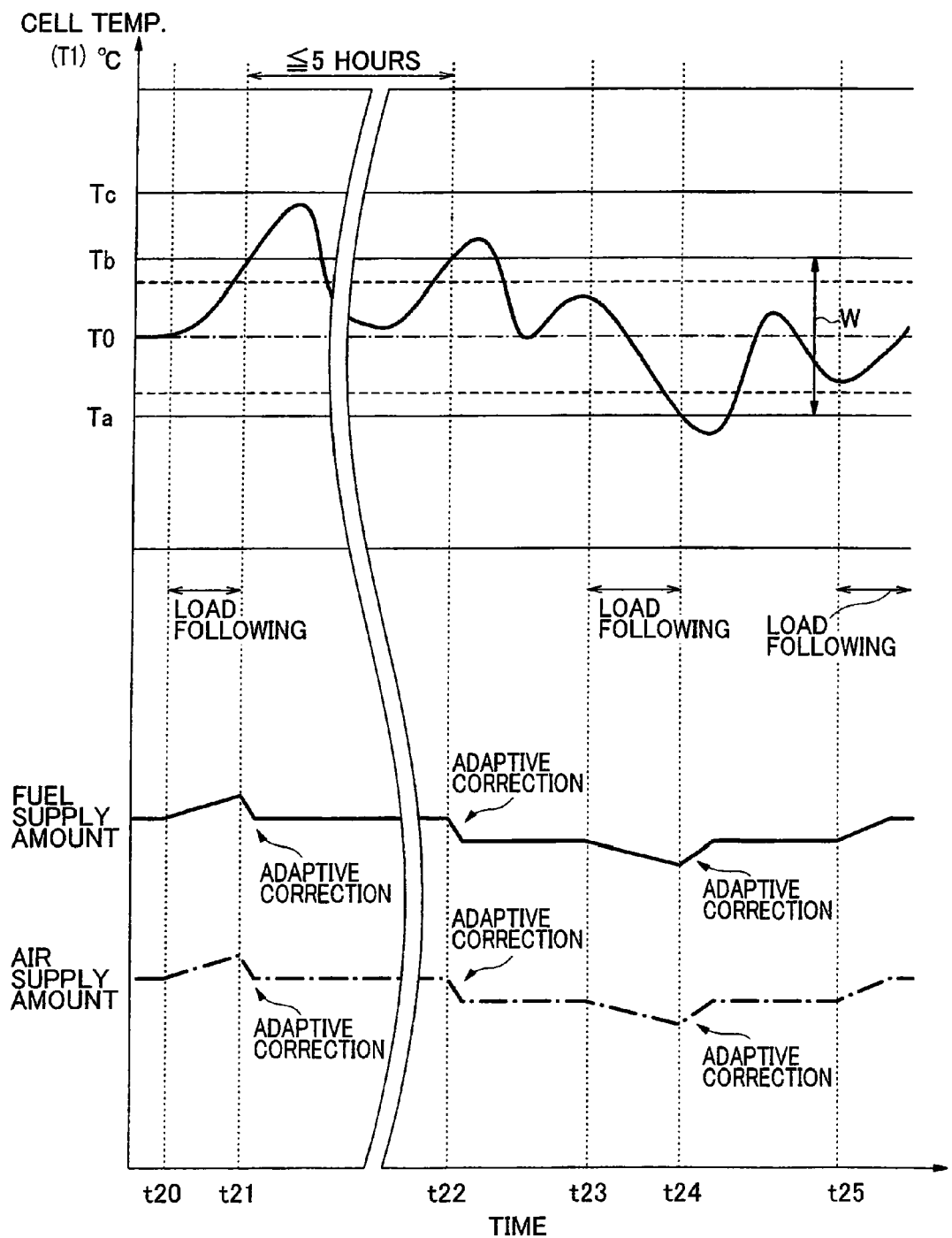
FIG. 12: A timing chart showing an example of temperature band restriction control in a solid oxide fuel cell.

FIG. 9 is a timing chart explaining the determination of degradation in a solid oxide fuel cell (SOFC) system according to an embodiment of the present invention. FIG. 10 is graph showing an example of the relationship between the required generation amount input to the control section 110 and the fuel supply amount required to produce the required generation amount. FIG. 11 is graph showing an example of the change over time in fuel supply amount relative to the change in required generation amount. FIG. 12 is a flow chart showing a degradation determination procedure using a degradation determining means.

At times t0-t1 in FIG. 9, the solid oxide fuel cell system 1 is performing a load following operation so that an output power can be obtained in accordance with the amount of generation required by the inverter 54 (FIG. 6). As shown in FIG. 6, that is, the control section 110 serving as controller sends signals to the fuel flow rate regulator unit 38 serving as fuel supply device, the reforming air flow rate regulator unit 44 serving as oxidant gas supply device, and the water flow rate regulator unit 28 serving as water supply device in accordance with the amount of generation required from the inverter 54, and supplies the required flow rates of fuel, air, and water to the fuel cell module 2. The output power of the solid oxide fuel cell system 1 thus varies, as shown in FIG. 9, so as to follow the amount of generation required from the inverter 54. Here a delay is applied to the output power response relative to the amount of fuel supplied, etc.; the output power changes with a delay relative to changes in the fuel supply amount, etc., and there is almost no change in output power relative to sudden changes in the amount of generation required. Note that the control section 110, the fuel flow rate regulator unit 38, the generating air flow rate regulator unit 45, and the water flow rate regulator unit 28 respectively function as a control means, a fuel supply means, an oxidant gas supply means, and a water supply means.

The control section 110 determines the fuel supply amount using a graph, one example of which is shown in FIG. 10, and controls the fuel flow rate regulator unit 38 such that the determined fuel is supplied to the fuel cell module 2 in response to the amount of generation required from the inverter 54. After the initial start of use of the solid oxide fuel cell system 1 up until a determination is made that the fuel cell module 2 has degraded, the control section 110 determines a fuel supply amount relative to the required generation amount in accordance with curve F0 in FIG. 10. As shown in FIG. 10, the fuel supply amount is determined in such a way that it grows monotonically with the increase in required generation amount, but under a required generation amount of approximately 200 W, the fuel supply amount is approximately a fixed value.

When the required generation amount is changed, sudden changes in the fuel supply amount can hasten degradation of the fuel cell module 2, therefore the fuel supply amount is gradually increased or decreased as shown in FIG. 11. FIG. 11 is a graph showing an example of the change in fuel supply amount versus time when the required generation amount is changed in a stepped manner from 500 W to 700 W. As shown in FIG. 11, when the required generation amount is changed from 500 W to 700 W at time t10, the required fuel supply amount is suddenly changed from a fuel supply amount corresponding to an output power of 500 W to one corresponding to 700 W. In response, the control section 110 controls the fuel flow rate regulator unit 38 so that the fuel supply amount is increased slowly, as shown by the imaginary line in FIG. 11, to avoid a sudden increase in the fuel supply amount. Note that after the initial start of use of the solid oxide fuel cell system 1, up until a determination is made that the fuel cell module 2 has degraded, the control section 110 increases the fuel supply amount in accordance with the curve F10 in FIG. 11.

Similarly at time t11, even if the required generation amount changes from 700 W to 500 W, the control section 110 gradually decreases the fuel supply amount as shown by line F10 in FIG. 11 so that there is not a sudden decrease in the fuel supply amount. Note that the rate of change in the fuel supply amount is set to be more gradual when increasing the fuel supply amount than when decreasing it.

Note that FIGS. 10 and 11 relate to fuel supply amount, but changes occur similarly in the air supply amount and water supply amount relative to the required generation amount.

Figure 13:
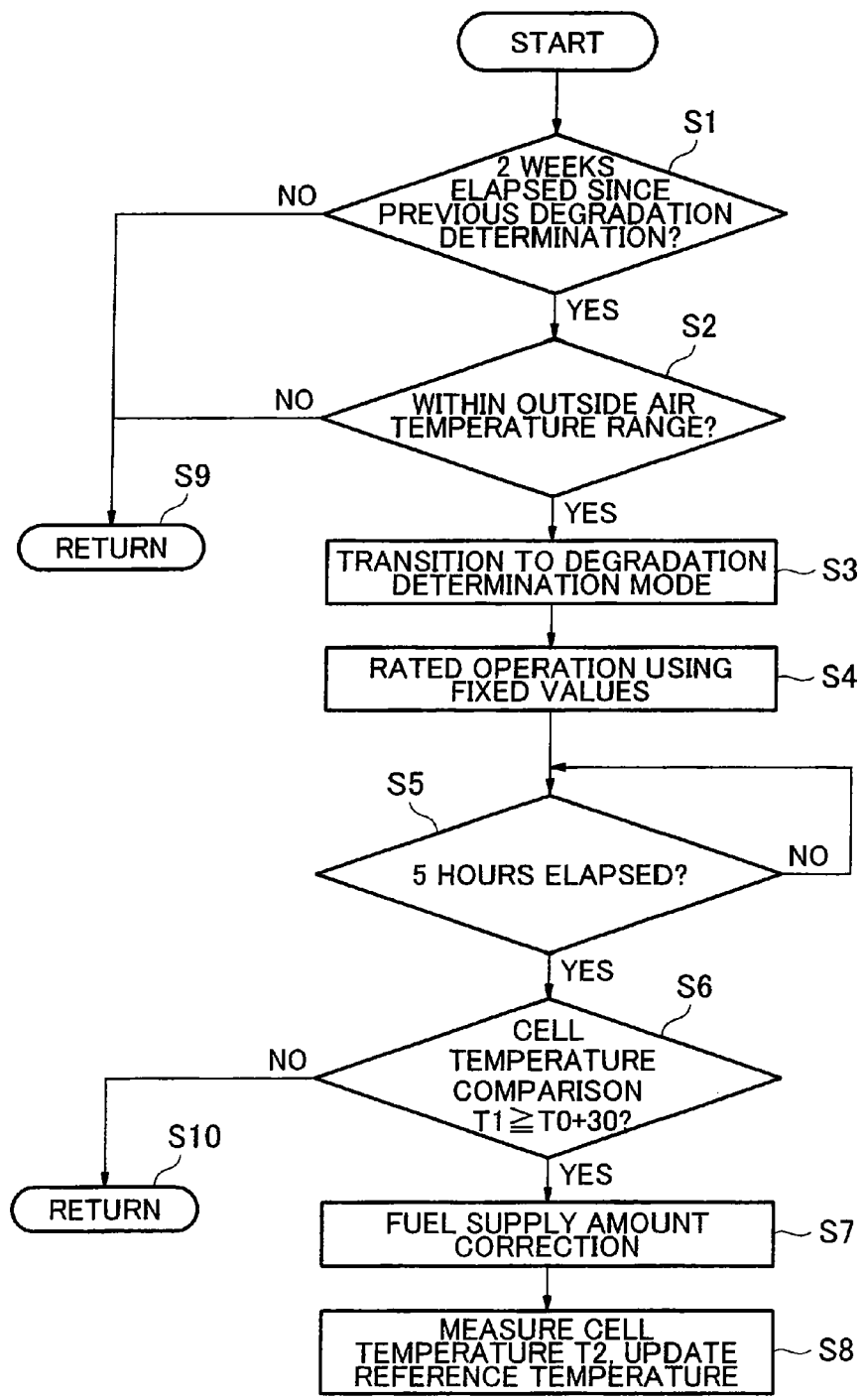
FIG. 13: A flow chart showing a degradation determination procedure using a degradation determining means.

Next, referring to FIGS. 9 through 13, we discuss control of the solid oxide fuel cell system 1. FIG. 9 is a timing chart explaining the determination of degradation in a solid oxide fuel cell (SOFC) system according to an embodiment of the present invention. FIG. 10 is graph showing an example of the relationship between the required generation amount input to the control section 110 and the fuel supply amount required to produce the required generation amount. FIG. 11 is graph showing an example of the change over time in fuel supply amount relative to the change in required generation amount. FIG. 13 is a flow chart showing a degradation determination procedure using a degradation determining means.

At times t0-t1 in FIG. 9, the solid oxide fuel cell system 1 is performing a load following operation so that an output power can be obtained in accordance with the amount of generation required by the inverter 54 (FIG. 6). As shown in FIG. 6, that is, the control section 110 sends signals to the fuel flow rate regulator unit 38 serving as fuel supply device, the generating air flow rate regulator unit 45 serving as generating oxidant gas supply device, and the water flow rate regulator unit 28 serving as water supply device in accordance with the amount of generation required from the inverter 54, and supplies the required flow rates of fuel, air, and water to the fuel cell module 2. The output power of the solid oxide fuel cell system 1 thus varies, as shown in FIG. 9, so as to follow the amount of generation required from the inverter 54. Here a delay is applied to the output power response relative to the amount of fuel supplied, etc.; the output power changes with a delay relative to changes in the fuel supply amount, etc., and there is almost no change in output power relative to sudden changes in the amount of generation required.

The control section 110 determines the fuel supply amount using a graph, one example of which is shown in FIG. 10 in response to the amount of generation required from the inverter 54 and controls the fuel flow rate regulator unit 38 so that the determined amount of fuel is supplied to the fuel cell module 2. After the initial start of use of the solid oxide fuel cell system 1 up until a determination is made that the fuel cell module 2 has degraded, the control section 110 determines a fuel supply amount relative to the required generation amount in accordance with curve F0 in FIG. 10. As shown in FIG. 10, the fuel supply amount is determined in such a way that it grows monotonically with the increase in required generation amount, but under a required generation amount of approximately 200 W, the fuel supply amount is approximately a fixed value.

When the required generation amount is changed, sudden changes in the fuel supply amount can hasten degradation of the fuel cell module 2, therefore the fuel supply amount is gradually increased or decreased as shown in FIG. 11. FIG. 11 is a graph showing the change in fuel supply amount versus time when the required generation amount is changed in a stepped manner from 500 W to 700 W. As shown in FIG. 11, when the required generation amount is changed from 500 W to 700 W at time t10, the required fuel supply amount is suddenly changed from a fuel supply amount corresponding to an output power of 500 W to one corresponding to 700 W. In response, the control section 110 controls the fuel flow rate regulator unit 38 so that the fuel supply amount is increased slowly, as shown by the imaginary line in FIG. 11, to avoid a sudden increase in the fuel supply amount, i.e., so that the rate of change per unit time in the fuel supply amount is a predetermined value. Note that after the initial start of use of the solid oxide fuel cell system 1, up until a determination is made that the fuel cell module 2 has degraded, the control section 110 increases the fuel supply amount in accordance with the curve F10 in FIG. 11.

Similarly at time t11, even if the required generation amount changes from 700 W to 500 W, the control section 110 gradually decreases the fuel supply amount as shown by line F10 in FIG. 11 so that there is not a sudden decrease in the fuel supply amount. Note that the rate of change per unit time in the fuel supply amount is set to be more gradual when increasing the fuel supply amount than when decreasing it.

Note that FIGS. 10 and 11 relate to fuel supply amount, but changes occur similarly in the air supply amount and water supply amount relative to the required generation amount.

Next, referring to FIG. 12, we discuss the temperature band restriction control of the fuel cell units 16 by the control section 110. FIG. 12 is a timing chart showing an example of temperature band restriction control in the solid oxide fuel cell of the present embodiment.

A fuel cell module 2 maximum temperature Tb corresponding to the solid oxide fuel cell system 1 rated output power of 700 W, and the minimum temperature Ta for suitable operation of the solid oxide fuel cell system 1, are respectively stored in the control section 110. The control section 110 performs temperature band restriction control of the solid oxide fuel cell system 1 using temperature band between this maximum temperature Tb and minimum temperature Ta as the temperature monitoring band W. In other words, the control section 110 adaptively corrections the fuel supply amount and air supply amount when the fuel cell module 2 temperature departs from the temperature monitoring band W so as to quickly return the fuel cell module 2 temperature to within the temperature monitoring band W.

At times t20-t21 in FIG. 12, following the increase in the required generation amount for the solid oxide fuel cell system 1, the fuel supply amount and air supply amount are increased, and the fuel cell unit 16 temperature rises concomitantly. At time t21, when the fuel cell unit 16 temperature exceeds the maximum temperature Tb, the control section 110 executes an adaptive correction, reducing the fuel supply amount and air supply amount by a predetermined amount. In other words, the curve F0 shown in FIG. 10 is shifted downward by a predetermined amount by adaptive correction. The fuel cell unit 16 temperature is thus reduced. The fuel supply amount and air supply amount are held for a predetermined time following adaptive correction, irrespective of subsequent shifts in the fuel cell unit 16 temperature. In the present embodiment, the fuel supply amount and air supply amount are held for 5 hours following adaptive correction. Next, at time t22, when the fuel cell unit 16 temperature again exceeds the maximum temperature Tb, the control section 110 executes an adaptive correction, reducing the fuel supply amount and air supply amount by a predetermined amount.

At time t23, when a predetermined time has elapsed after time t22, load following control is again started. Under load following control, when the temperature of the fuel cell units 16 becomes lower than the minimum temperature Ta at time t24, the control section 110 executes adaptive correction and raises the fuel supply amount and air supply amount by a predetermined amount. In other words, the post-adaptive correction curve F0 at time t22 is shifted upward by a predetermined amount using adaptive correction. The temperature of the fuel cell units 16 is thus increased.

By repeating this type of adaptive correction, the curve F0 is shifted to a suitable position so that fuel cell units 16 are operated within the temperature monitoring band W. Individual differences and the like between fuel cell units 16 are thus absorbed, and the solid oxide fuel cell system 1 can be operated with appropriate fuel supply and air supply amounts. Note that in the present embodiment there is a restriction applied so that the total number of shifts of the curve F0 does not exceed a predetermined number. In other words, over-increases in the fuel supply amount due to excessive repetitions of only shifts to raise the curve F0 and over-decreases in the fuel supply amount due to excessive repetitions of only shifts to decrease the curve F0 are prevented.

Next, referring again to FIG. 9, the degradation determining mode operation will be discussed.

At time t1 in FIG. 9, the degradation determining means 110a built into the control section 110 starts operation of the degradation determining mode (FIG. 6). Note that the degradation determining means 110a is a degradation determining circuit comprising a microprocessor, memory, a program for activating same, and the like (none of the above is shown). FIG. 13 is a flow chart showing the process carried out by the degradation determining means 110a.

The flow chart shown in FIG. 13 is executed each predetermined time interval by the degradation determining means 110a. First, in step S1, a determination is made of time elapsed since the previous degradation determining mode operation. If the predetermined 2 week degradation determining interval has not elapsed since the previous degradation determining mode operation, the system advances to step S9, and one iteration of this flow chart is completed. This process makes it possible to prevent wasting of fuel, etc. caused by unnecessarily frequent execution of the degradation determining mode operation.

If the 2 week degradation determining interval or more has elapsed since the previous degradation determining mode operation, the system advances to step S2, and a judgment is made as to whether the solid oxide fuel cell system 1 external environment is in a predetermined degradation determining atmosphere state appropriate to the degradation determining mode operation. Specifically, a determination is made as to whether the outside air temperature and outside air humidity detected by the outside air temperature sensor 150 (FIG. 6) and outside air humidity sensor (not shown) conform to predetermined conditions. In the present embodiment, if the outside air temperature is 5-30° C. and the outside air humidity is 30-70%, the outside environment is judged to be in a degradation determining atmospheric state appropriate to the degradation determining mode operation. If it is judged that the external environment is not in the degradation determination outside atmospheric state, the system advances to step S9, and one iteration of this flow chart is completed.

When the outside environment is suited to the degradation determining mode operation, the system advances to step S3, and the degradation determining mode operation is started. Moreover, in step S4 certain values are fixed at predetermined values corresponding to predetermined degradation determining generation amounts for which the fuel supply, air supply, and water supply amounts are set in advance. In other words, in the degradation determining mode operation, the degradation determining means 110a controls the fuel flow rate regulator unit 38, the generating air flow rate regulator unit 45, and the water flow rate regulator unit 28 to maintain a fixed supply amount irrespective of the required generation amount being requested of the control section 110. At time t1 in FIG. 9 of the present embodiment, the degradation determining fuel supply amount is fixed at 3 L/min, the degradation determining oxidant gas supply amount at 100 L/min, and the degradation determining water supply amount at 8 mL/min.

The fixed values corresponding to these degradation determination generation amounts are the supply amounts corresponding to 700 W, which is the rated generation amount of the solid oxide fuel cell system 1. Therefore the solid oxide fuel cell system 1 has the ability to output 700 W of electrical power while fuel, air, and water are being supplied in these fixed values, but if the required generation amount does not reach 700 W, the extra fuel will not be used for electrical generation, and will be combusted in the combustion chamber 18.

Next, in step S5 of FIG. 13, after operation using fixed values has been started, a judgment is made as to whether sufficient time has elapsed and a stable operating state has been achieved. In the present embodiment, after operation using fixed values has been started, the stable operating state is judged based on whether the 5 hour degradation determining time has elapsed. If the fixed value-based time of 5 hours after start of operation has not elapsed, the step S5 process is repeated. Operation using fixed values started in step S4 is thus maintained over a period of 5 hours (FIG. 9, times t1-t2).

After fixed value-based operation has continued for 5 hours, the system advances to step S6 at time t2 in FIG. 9, and a judgment is made as to whether the temperature of the fuel cell module 2 measured by the generating chamber temperature sensor 142 is equal to or greater than a predetermined temperature. In other words, degradation of the fuel cell module 2 is determined by comparing the temperature of the fuel cell module 2 resulting from operation of the fuel cell module 2 in a stable operating state with a reference temperature serving as a predetermined degradation determination reference value. In the solid oxide fuel cell system 1 of the present embodiment, the reference temperature T0 of the fuel cell module 2 when operated at rated power of 700 W in the initial state is approximately 700° C.; as degradation of the fuel cell module 2 progresses, this temperature rises. This is caused by degradation of the fuel cell units 16 themselves, consisting of individual fuel cells, and by joule heating and the like due to increased internal resistance of the fuel cell stack 14 as the result of degradation in the junction portion which electrically connects the various fuel cell units 16.

In the present embodiment, the degradation determining means 110a determines that the fuel cell module 2 has degraded when the temperature T1 measured by the generating chamber temperature sensor 142 is 30° C. or more above the reference temperature T0. If the fuel cell module 2 has not degraded, the system advances to step S10, and one iteration of this flow chart process is completed; no change is made to operating conditions such as fuel supply amount.

If it is determined that a fuel cell module 2 has degraded, the system advances to step S7, and degradation processing is started. In step S7, a fuel supply correction is executed, and the fuel supply amount and gain in fuel supply amount relative to required generation amount are changed. In other words, if it is first determined that a fuel cell module 2 has degraded after the start of use of the solid oxide fuel cell system 1, the fuel supply amount relative to the required generation amount will be changed by fuel supply correction from the line F0 to the line F1 in FIG. 10, and thereafter fuel supply amounts will be determined using the line F1. The rate of change per unit time of fuel supply amount when changing the fuel supply amount is changed from line F10 to line F11, which is a lower rate of change, in FIG. 11, and thereafter the fuel supply amount is changed using this rate of change. After a determination is made that the fuel cell module 2 has degraded, the control section 110 executes a degradation mode operation with changed operating conditions; the changed fuel supply amount and the like are maintained until it is determined that the fuel cell module 2 has degraded further.

When a fuel cell module 2 degrades, power output relative to the same fuel supply amount declines, so the fuel supply amount is determined by following a curve F1, in which the fuel supply amount is increased by 10% relative to the curve F0, thereby correcting the reduction in output power. A sudden change to the amount of fuel supplied to a fuel cell module 2 can lead to further degradation Therefore, the rate of change in the fuel supply amount is made smaller.

Note that if degradation is once again determined to have occurred, the fuel supply amount is changed from the curve F1 to the curve F2; if it is yet again determined to have occurred, there is a change from the curve F2 to the curve F3. The fuel supply amount in curve F2 is increased 18% relative to curve F0, and F3 is increased 23% relative to curve F0. Hence 10% of an initial fuel supply amount is increased on the first determination of degradation, a further 8% of the initial fuel supply amount is increased on the second determination (for a total of 18%), and a further 5% of the initial fuel supply amount is increased on the third determination (for a total of 23%). Correction of the fuel supply executed is thus set so that the amount of the fuel increase becomes smaller in later executions. Excessive burden on a fuel cell module 2 in which degradation is progressing can in this way be prevented. The fuel supply amount gain is also changed from line F11 to line F12 on the second degradation determination, and from line F12 to line F13 on the third degradation determination. In other words, the change per unit time in the fuel supply amount is made more gradual as degradation of the fuel cell module 2 advances.

Thus in the present embodiment the amount of increase of the fuel supply amount when degradation is determined is a pre-set fixed value. Therefore unlike cases in which, for example, the fuel supply amount correction amount is calculated based on the rise in temperature of a fuel cell module 2 or based on the amount of decline in output power, highly erroneous corrections can be prevented from occurring. That is, the temperature or output power of a fuel cell module 2 are affected by various factors which change their values, so calculating the amount of correction based on these values results in the execution of anomalous corrections when an anomalous temperature or output power is measured due to some factor.

After the fuel supply amount is corrected, the system advances to step S8; in step S8, the temperature T2 of a fuel cell module 2 when the solid oxide fuel cell system 1 is operated using the post-correction fuel supply amount is measured by the generating chamber temperature sensor 142. The measured temperature T2 is stored in the degradation determining means 110a memory (not shown) as a new reference temperature T0. This new reference temperature T0 is used as the reference temperature for the next degradation determination. Preferably, the temperature T2 of the fuel cell module 2 measured after operation is conducted with the fuel supply amount at a fixed level for a predetermined time following correction of the fuel supply amount. This enables accurate temperature measurement which excludes the effects of changes to the fuel supply amount by corrections.

When the degradation processing described above is completed, the degradation determining means 110a ends the degradation determining mode operation, and the control section 110 resumes normal operation responsive to the required generation amount (FIG. 9, time t2).

Moreover, if a user of the solid oxide fuel cell system 1 is using more electrical power than the rated power of the solid oxide fuel cell system 1, the required generation amount sent to the control section 110 from the inverter 54 will become the rated power of the solid oxide fuel cell system 1. If this type of condition continues over a long time period it will result in the amounts of fuel, air, and water to a fuel cell module 2 becoming fixed values corresponding to the rated power over a long time period (FIG. 9, times t3-t4).

The degradation determining means 110a executes degradation determination even when such a stable operating state continues for the degradation determining time of 5 hours or more. In other words, at time t4 in FIG. 9, the degradation determining means 110a compares the temperature T1 measured by the generating chamber temperature sensor 142 with the reference temperature T0 and determines if the temperature T1 is 30° C. or more above the reference temperature T0. When the temperature T1 is 30° C. or more above the reference temperature T0, the degradation determining means 110a determines that degradation of the fuel cell module 2 has further advanced, and changes the operating conditions to correct for this degradation. If this is the second time a degradation has been determined, the fuel supply amount is changed from curve F1 to curve F2, and the rate of change per unit time in the fuel supply amount is changed from line F11 to the more reduced line F12.

However, no correction to the fuel supply amount is executed if the predetermined minimum correction interval of 0.5 years has not elapsed since the previous fuel supply amount correction, even if a degradation is determined to have occurred. This prevents a situation in which excessive fuel supply correction is executed in a short time period so that degradation of a fuel cell module 2 proceeds faster than anticipated.

Furthermore, the degradation determining means 110a starts the degradation determining mode operation at time t5 in FIG. 9. In this degradation determining mode operation, the supplies of fuel, air, and water are fixed at a supply amount corrected by the degradation determination. In other words, when it is determined that the fuel cell module 2 has degraded twice in the past, the fuel supply is fixed at an amount corresponding to the rated output, which is determined based on the curve F2 in FIG. 10.

The degradation determining means 110a measures the fuel cell module 2 temperature T1 at time t6, 5 hours after the start of the degradation determining mode operation, and performs a degradation determination. At this point, if there is a determination that the fuel cell module 2 has degraded, and this is the third determination of degradation, the fuel supply amount is changed from curve F2 to curve F3, and the fuel supply amount rate of change is changed from line F12 to line F13. Note that when the measured fuel cell module 2 temperature T1 exceeds the predetermined correction prohibition temperature of 900° C., the degradation determining means 110a does not execute a correction of the fuel supply amount even if a degradation of the fuel cell module 2 has been determined.

If there is further degradation and a determination of degradation is made a fourth time, the degradation determining means 110a stops to execute further corrections to the fuel supply amount or the like. Thereafter, the control section 110 does not control to change the output power in response to the required generation amount, but rather performs controls so that a predetermined power is output constantly.

The degradation determining means 110a stops operation of the solid oxide fuel cell system 1 when the output power relative to a pre-set, predetermined fuel supply amount falls to a predetermined power or below. Also, the degradation determining means 110a sends a signal to the warning device 116 to inform users that the product life of the solid oxide fuel cell system 1 has been reached. This prevents wasting of fuel by use of a solid oxide fuel cell system 1, whose generating efficiency has fallen due to advancing degradation.

In the solid oxide fuel cell of this embodiment of the present invention, when it is determined that the fuel cell module has degraded, the rate of change per unit time in the fuel supply amount is reduced, therefore the temperature change in the fuel cell module is made more gradual, and the advance of fuel cell module degradation can be restrained.

Also, in the solid oxide fuel cell of this embodiment of the present invention, the degradation determining means determines a degradation of the fuel cell module in a stable operating state. Therefore, the fuel cell module degradation can be more accurately known, and the control section can suitably control so as to restrain the advance of degradation.

Moreover, in the solid oxide fuel cell of this embodiment of the present invention, the controls section controls so as to limit the range of fuel cell unit temperature change to be within a predetermined range. Therefore, the temperature change in the fuel cell module becomes even more gradual, and the advance of fuel cell module degradation can be effectively restrained.

Also, in the solid oxide fuel cell of the present embodiment, the rate of change in the fuel supply amount is changed to match the degree to which degradation of the fuel cell module has progressed. Therefore, in a state whereby degradation is not advancing, the fuel supply amount is changed relatively quickly, so that the load following operation with the required generation amount is rapid, whereas when degradation has advanced, further degradation of the fuel cell module can be restrained by reducing the rate of change in the fuel supply amount. The life of the fuel cell module can thus be extended by assuring the output power following the required generation amount.

Furthermore, in the solid oxide fuel cell of the present embodiment, after degradation has advanced to a predetermined state, the control section performs controls so that a fixed power is output. Therefore, the change in fuel cell module temperature can be reduced, and further advance in the degradation of the fuel cell module can be restrained.

Although we have explained an embodiment of the present invention above, a variety of variations can be added to the above-described embodiment. In particular, in the above-described embodiment the solid oxide fuel cell control section is furnished with a degradation determining means, and when this degradation determining means determines that the fuel cell module has degraded, the rate of change per unit time in the fuel supply amount relative to the change in required generation amount is subsequently lowered, but the present invention could also be constituted so that the control section estimates degradation rather than determining degradation. For example, the present invention could be constituted so that when a predetermined period elapses after the initial start of use of the solid oxide fuel cell, the control section subsequently estimates degradation of the fuel cell module and reduces the rate of change per unit time in the fuel supply amount relative to changes in required generation amount. This enables the present invention to be constituted simply, without providing a special degradation determining means.

The present invention can also be constituted to perform multiple degradation estimates. In other words, the present invention can be constituted so that the first estimate of degradation is made based on the elapse of a predetermined period from the start of initial use, then the second and subsequent estimates of degradation are made when a further predetermined period has elapsed. In that case, the present invention could be constituted so that the rate of change per unit time in the fuel supply amount relative to changes in the required generation amount is more greatly reduced as the time period from the start of initial use becomes longer.

Moreover, in the above-described embodiment the determination of degradation is performed multiple times, but the present invention can also be constituted so that the degradation determination is performed only once.

EXPLANATION OF REFERENCE NUMERALS

1: Solid oxide fuel cell
2: Fuel cell module
4: Auxiliary unit
8: Sealed space
10: Electrical generating chamber
12: Fuel cell assembly
14: Fuel cell stack
16: Fuel cell units (solid oxide fuel cells)
18: Combustion chamber
20: Reformer
22: Heat exchanger for air
24: Water supply source 26: Pure water tank
28: Water flow rate regulator unit (water supply device; water supply means)
30: Fuel supply source
38: Fuel flow rate regulator unit (fuel supply device; fuel supply means)
40: Air supply source
44: Reforming air flow rate regulator unit
45: Generating air flow rate regulator unit (oxidant gas supply device; oxidant gas supply means).
46: First heater
48: Second heater
50: Hot water production device
52: Control box
54: Inverter
83: Ignition device
84: Fuel cells
110: Control section (controller, control means)
110a: Degradation Determining Means
112: Operating device
114: Display device
116: Warning device
126: Electrical power state detecting sensor
142: Generating chamber temperature sensor (temperature detection means)
150: Outside air temperature sensor

The invention claimed is:

1. A solid oxide fuel cell system which varies output power in response to a required amount of power generation, comprising:

a fuel cell module comprising multiple fuel cell units;

a fuel supply device that supplies fuel to the fuel cell module;

an oxidation gas supply device that supplies oxidation gas to the fuel cell module; and a controller programmed to change, when the required amount of power generation changes, an amount of fuel supply from the fuel supply device such that after degradation of the fuel cell module is predicted or found, a rate at which the amount of fuel supply is changed is reduced.

2. The solid oxide fuel cell system of claim 1, wherein the controller is programmed to predict degradation of the fuel cell module based on operation hours of the fuel cell module.

3. The solid oxide fuel cell system of claim 1, wherein the controller is programmed to change, when the required amount of power generation changes, the amount of fuel supply at a greater rate as the degradation of the fuel cell module is predicted or found more progressed, or as the fuel cell module operates over a longer term.

4. The solid oxide fuel cell system of claim 3, wherein the controller is programmed to stop, when the controller predicts or finds that the fuel cell module has degraded to a predetermined level, changing the amount of fuel supply according in response to the required amount of power generation and control the amount of fuel supply so that the fuel cell module outputs a power at a predetermined level.

* * * * *

UNITED STATES PATENT AND TRADEMARK OFFICE
CERTIFICATE OF CORRECTION

PATENT NO. : 8,980,496 B2  
APPLICATION NO. : 13/262141  
DATED : March 17, 2015  
INVENTOR(S) : Ooe et al.

Page 1 of 1

It is certified that error appears in the above-identified patent and that said Letters Patent is hereby corrected as shown below:

<u>On the Title Page</u>

Item (75), after "Kiyotaka Nakano," replace "Kitayushu" with --Kitakyushu--.

Signed and Sealed this  
Third Day of November, 2015

Michelle K. Lee  
*Director of the United States Patent and Trademark Office*